Sept. 29, 1959  W. P. DENNIS  2,906,642
PROCESS FOR FORMING COMPOSITE CELLULAR STRUCTURES
Filed Jan. 22, 1957
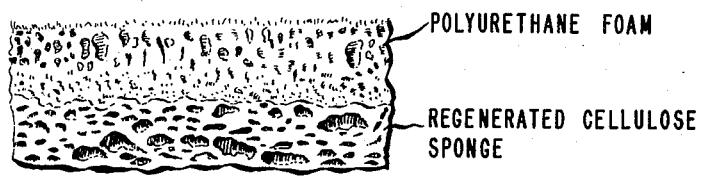
INVENTOR
WILLIAM PATTERSON DENNIS
BY
ATTORNEY

United States Patent Office 2,906,642
Patented Sept. 29, 1959

2,906,642

PROCESS FOR FORMING COMPOSITE CELLULAR STRUCTURES

William Patterson Dennis, Fort Sill, Okla., assignor to E. I. du Pont de Nemours and Company, Wilmington, Del., a corporation of Delaware Application January 22, 1957, Serial No. 635,512

4 Claims. (Cl. 117—56)

This invention relates to composite cellular structures, and, more particularly, to composite porous structures of polyurethane foam bonded to regenerated cellulose and like hydrophilic (water absorptive) sponge structures, and to the process for producing such composite structures.

Polyurethane foams constitute excellent sponge-like materials having abrasive, wear-resistant, and heat-resistant surfaces which are very useful for cleaning purposes. These foams, however, are hydrophobic, and hence do not absorb water except by means of a slight wicking action. Thus, when they are being used for cleaning such things as pots, pans, etc., it becomes necessary to add extra water to keep the surfaces which are being cleaned wet. On the other hand, regenerated cellulose sponges, polyvinyl formal sponges, natural sponges, and the like, readily take up water and other liquids and function as liquid reservoirs. However, these sponges, particularly when wet, are inherently soft and non-abrasive, and do not exhibit the abrasiveness or wear-resistance of polyurethane sponges under scrubbing conditions. Attempts to form a composite structure comprised of preformed blocks or sheets of foam and sponge, bonded back-to-back through the agency of known adhesives, have failed principally for the reasons that the adhesive bond between the two preformed structures does not stand up well and there is insufficient permeability between the bonds, i.e., the bonding layer generally serves as a liquid barrier.

An object of this invention, therefore, is to provide a composite structure of polyurethane foam bonded to a dissimilar sponge, the composite structure having satisfactory strength and permeability over the area of the bond. Another object is to provide a simple, economical process for producing a polyurethane foam and hydrophilic sponge structure. Still another object is to provide a permeable, composite, cellular structure having one surface composed of polyurethane foam and an opposed surface composed of regenerated cellulose sponge. A further object is to provide a permeable composite cellular structure comprising a preformed sheet or block of regenerated cellulose sponge having one surface covered with polyurethane foam directly and strongly bonded to said surface. The foregoing and additional objects will more clearly appear hereinafter.

These objects are realized by the present invention which, briefly stated, comprises forming in situ on a treated surface of a preformed hydrophilic sponge structure, e.g., a block or sheet of regenerated cellulose sponge, a polyurethane foam by depositing on the treated sponge surface a fluid foam-forming mixture of water and a polyurethane product containing free isocyanate groups, said product resulting from the reaction of (1) an organic compound containing, as the sole reacting groups, a plurality of isocyanate groups, and (2) at least one polymeric organic substance containing active hydrogen; the sponge surface having previously been treated by distributing thereon a material which is not completely dissolved in the constituents of the liquid foam-forming mixture. The foam sets up permanently, either spontaneously or by the immediate application of heat, and cures to a final state standing at room temperature. The resulting foam is strongly adhered through a permeable bond whch penetrates into the surface pores of the preformed sponge structure.

The preparation of cellular plastic products (herein termed "polyurethane foams") from free isocyanate radical-containing polyurethane products resulting from the reaction between (1) an alkyd or other active hydrogen-containing organic polymeric material and (2) organic compounds containing, as the sole reacting groups, a plurality of isocyanate groups, is described in "German Plastics Practice" by De Bell et al., 1946, pp. 316 and 463–465. Other disclosures of reactants and methods which may be employed to produce polyurethane foams applicable to this invention are United States Patents 2,282,827 (Rothrock), 2,284,637 (Catlin), 2,284,896 (Hanford et al.), 2,292,443 (Hanford), 2,333,639 (Christ et al.), 2,358,475 (Pratt et al.), and 2,374,163 (Rothrock); and United States patent applications Serial Nos. 340,168 (Detrick et al.), filed March 3, 1953, now Patent No. 2,787,601; 369,240 (Barthel), filed July 20, 1953, now Patent No. 2,788,335; 381,745 (Mitchell), filed September 21, 1953, now Patent No. 2,850,464; 383,370 (Barthel), filed September 30, 1953, now Patent No. 2,833,730; 395,843 (Roussel), filed December 2, 1953, now Patent No. 2,842,506; and 405,036 (Mitchell), filed January 19, 1954, now Patent No. 2,814,600.

As an organic compound containing, as the sole reacting groups, a plurality of isocyanate groups there may be used, in the preparation of the polyurethane product, any of the poly-NCX compounds, X being oxygen or sulfur, i.e., any polyisocyanate, any polyisothiocyanate, or any isocyanate-isothiocyanate. The polyisocyanates, because of their greater reactivity are preferred to the polyisothiocyanates. The preferred compounds are those having two groups of the formula —NCX and, of these, the aryl diisocyanates and the aryl diisothiocyanates in general are more useful in the practice of the present invention and form a preferred class because of their ease of preparation, low cost, reactivity, etc. Examples of this class are: 2,4-toluene diisocyanate, 2,6-toluene diisocyanate, m-phenylene diisocyanate, 4-chloro-1,3-phenylene diisocyanate, 1-chlorophenylene 2,4-toluene diisocyanate, naphthalene 1,5-diisocyanate.

Active hydrogen-containing polymeric organic substances suitable for use in the preparation of polyurethane products may be selected from a wide variety of polyfunctional compounds, including polyamines, polyalcohols, aminoalcohols, polyhydroxy esters, polyamides, polythiols, polysulfonamides, and various mixtures of these types. Other long-chain polyhydroxy and polycarboxy compounds useful in this invention are alkyd resins containing terminal hydroxyl and carboxyl groups, said resins being formed by the reaction between a polyhydroxy or polycarboxy compound with a dibasic acid. Examples of the alkyd resin reactants are: glycols, glycerine, trimethylol propane, reacted with dibasic acids, such as adipic, phthalic, succinic, maleic, and carbonic.

Formation of polyurethane foam can be varied within wide limits by a suitable selection of the reactive compounds, so as to vary the degree of hardness or elasticity. Catalysts and emulsifiers may be added to control the rate of foaming and the cell structure of the foam.

Although the combination of synthetic cellulose sponge and polyurethane foam constitutes the preferred combination of this invention, other sponges, such as polyvinyl formal sponge, natural sponge, sponge sheeting, etc., can be improved in utility in like manner by bonding on one or more surfaces thereof any polyurethane foam by the method indicated above. Cellulose sponge as employed in this invention may be manufactured by methods such as indicated in Banigan and Snyder—U.S.P. 2,280,022 and 2,295,823.

Prior to depositing the fluid mixture of water and polyurethane product on the surface of the sponge structure to which the polyurethane foam is to be bonded, the sponge surface is treated with an agent which is not completely dissolved in the constituents of the foam-forming fluid mixture, and which is capable of being removed either in later processing steps, e.g., in a later washing or purification step, or by the user. This pretreating agent apparently inhibits the foaming action of the fluid mixture immediately adjacent the applied surface of the sponge structure, and renders the foam somewhat more permeable at the bond. Examples of suitable pretreating agents are light hydrocarbons such as the lower boiling liquid petroleum fractions (hydrocarbons), e.g., gasoline, naphtha, benzene, kerosene, etc., oils, e.g., lubricating oils, and inorganic salts, such as sodium chloride, potassium chloride, etc. The degree of permeability, and the strength of the bond, in the composite structure can be controlled by the appropriate selection of pretreating agent and the distribution thereof on the surface of the sponge.

The amounts of the agents employed to control the degree of permeability, are, in general, not critical to the invention, as those skilled in the art can readily determine the amount required to suit their specific needs. Application of the agent to the porous structure may be by any of the several methods or combinations of methods, i.e., uniform or random, total or partial, coated or impregnated.

A typical composite structure is illustrated in the accompanying drawing wherein the single figure is a side elevation of a composite structure made up of a layer or block of regenerated cellulose sponge and a superimposed layer or block of polyurethane foam formed in situ. By means of the seepage of the foam-forming fluid mixture into the surface pores of the sponge structure immediately as it is deposited on the sponge, polyurethane foam, as shown in the drawing, sets up in the surface pores as well thus adding to the area and strength of the bond. It is also believed that a chemical bond is created between the cellulose of the sponge and the polyurethane product.

The following example of a preformed embodiment further illustrates the principles and practice of this invention.

*Example I*

A polyurethane mixture was made as follows:

| | |
|---|---|
| Polyester resin [1] _____ grams__ | 1000 |
| Water _____ cc__ | 43.0 |
| N-methyl morpholine _____ cc__ | 11.0 |
| Polyoxyethylene vegetable oil (emulsifier) ____ g__ | 1.35 |

[1] Polyester resin: Reaction product of diethylene glycol, adipic acid and trimethylol propane in a 13/13/1 molar ratio having the following properties:

| | |
|---|---|
| Viscosity _____ centipoises__ | 16,000 |
| Acid No _____ | 2.02 |
| Specific gravity _____ | 1.194 |
| Percent water _____ | 0.17 |
| Solids _____ percent__ | 100 |
| Hydroxyl No _____ | 66.8 |

The above ingredients were mixed together in a mixer at low speed for 2 minutes. To this mixture 295 grams of 80% 2,4- 20% 2,6 isomer of toluene diisocyanate were added and mixed in for 10 seconds at the low speed of the mixer. As soon thereafter as possible, the mixture was poured evenly on a 30″ x 20″ x ½″ slab of coarse pore cellulose sponge contained in a mold 30″ x 20″ x 2¼″ high.

The cellulose sponge had been sprinkled liberally with salt (NaCl) crystals which had been crushed to a powder. The polyurethane mixture was previously observed to start foaming after 30 seconds and completed foaming after about 2 minutes. After approximately 1 hour the mass was removed from the mold and cured by standing at room temperature for 1 day. The water permeability of the resulting composite structure was 0.50 pound of water per minute.

For testing the strength of the bond relative to the strength of the cellulose sponge and polyurethane foam components, a similar experiment was run with the cellulose sponge and polyurethane foam each being 2½″ in height. Samples were cut 5″ x 5″ x 10″, from the block and aged 3 days at room conditions, and tested on a Scott tensile tester, pulling perpendicular to the bond in the 10″ direction. In every sample tested, the bond held firmly and the cellulose sponge or polyurethane foam tore apart.

Permeability of the bond was measured as follows:

The testing apparatus consisted of a 2″ pipe flange which held the sample to be tested, a 2′ section of 2″ pipe above the flange in the source of water; a 2′ water head was maintained over the sponge clamped in the flange and the rate of water flow through the sponge was measured. By clamping the edges of the sponge in the pipe flange, none of the water could by-pass around the edges of the sponge and a true test of the permeability of the bond was obtained.

Specific improved products, though not limited to these, which can be made by application of the above invention, in addition to an all-purpose household and industrial scrubbing and wiping sponge as mentioned before, include an all-purpose household and industrial scrubbing and wiping mop, and a quick-drying sponge mop which is less susceptible to bacterial degradation.

Other sponge uses, as disclosed in Banigan et al.—U.S. Patents 2,280,022 and 2,295,823, and Saffert—U.S. Patent 2,138,712 may apply to the improved product and provide functional usage in wider utility than either sponge alone.

Household and industrial sponge mops, commonly made from cellulose sponge, can be improved in utility and wearability by bonding an abrasive foam onto part of the working surface of the sponge mop. The abrasive foam section of the mop can function to abrade in cleaning dirt and adhering material from the floor while the cellulose sponge section continues to function as in present cellulose sponge mops. For example, a mop can be made in which the abrasive foam fills and bonds into a groove or grooves cut into the working face of the cellulose sponge mop. Alternately, a mop can be made in which the abrasive foam fills an entire vertical section, for instance, the center vertical section, of the mop and the working face to the mop backing, and is bonded on either or on one vertical side to a cellulose sponge.

One drawback of cellulose sponge mops is the tendency to bacterial degradation next to the impermeable mop backing, perhaps because this is the last part of the mop to dry out after use. To eliminate this drawback, a mop can be made using the present invention in which a layer of foam with quick drying properties and with good air permeability, such as we are able to produce, is inserted between the major portion of the cellulose mop and the impermeable mop backing. A mop made in this manner will dry quickly and will be less susceptible to bacterial degradation.

I claim:

1. A process for producing a composite cellular structure which comprises (1) distributing over a surface of a preformed hydrophilic sponge structure an agent which partially dissolves in the constituents of fluid polyurethane foam-forming mixtures; (2) depositing on said surface, having distributed thereon said agent, a fluid foam-forming mixture of water and a polyurethane product containing a plurality of free isocyanate groups whereby to form in situ on said surface a permanent polyurethane foam; and (3) thereafter curing said foam.

2. The process of claim 1 wherein the sponge is regenerated cellulose sponge.

3. The process of claim 2 wherein the agent is finely divided sodium chloride crystals.

4. The process of claim 2 wherein the polyurethane product is the reaction product of toluene diisocyanate and a polyester resin of diethylene glycol, adipic acid and trimethylol propane.

References Cited in the file of this patent

UNITED STATES PATENTS

| | | |
|---|---|---|
| 2,356,079 | Nelles et al. | Aug. 15, 1944 |
| 2,468,716 | Nuquist et al. | Apr. 26, 1949 |
| 2,620,349 | Slocombe | Dec. 2, 1952 |

FOREIGN PATENTS

| | | |
|---|---|---|
| 1,103,628 | France | May 25, 1955 |